United States Patent
Zhai

(10) Patent No.: US 11,514,271 B2
(45) Date of Patent: Nov. 29, 2022

(54) SYSTEM AND METHOD FOR AUTOMATICALLY ADJUSTING STRATEGIES

(71) Applicant: Beijing DiDi Infinity Technology and Development Co., Ltd., Beijing (CN)

(72) Inventor: Jinjian Zhai, Union City, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 461 days.

(21) Appl. No.: 16/720,374

(22) Filed: Dec. 19, 2019

(65) Prior Publication Data

US 2021/0192292 A1    Jun. 24, 2021

(51) Int. Cl.
    *G06F 40/40*     (2020.01)
    *G06F 16/9035*   (2019.01)
    *G06K 9/62*      (2022.01)
    *G06N 20/00*     (2019.01)

(52) U.S. Cl.
    CPC ....... *G06K 9/6264* (2013.01); *G06F 16/9035* (2019.01); *G06F 40/40* (2020.01); *G06K 9/6224* (2013.01); *G06K 9/6267* (2013.01); *G06N 20/00* (2019.01)

(58) Field of Classification Search
    CPC .. G06K 9/6264; G06K 9/6224; G06K 9/6267; G06F 16/9035; G06F 40/40; G06N 20/00
    See application file for complete search history.

(56) References Cited

U.S. PATENT DOCUMENTS

| | | | | |
|---|---|---|---|---|
| 9,047,423 | B2* | 6/2015 | Tesauro | G06F 17/11 |
| 2006/0069620 | A1* | 3/2006 | Sutcliffe | G06Q 30/06 |
| | | | | 705/15 |
| 2018/0012153 | A1* | 1/2018 | Hu | G06Q 10/04 |
| 2021/0090017 | A1* | 3/2021 | Reiss | G06Q 10/0833 |

OTHER PUBLICATIONS

Wang et al., Inductive and Example-Based Learning for Text Classification, 2008, ISCA, whole document (Year: 2008).*

(Continued)

*Primary Examiner* — Sonia L Gay
(74) *Attorney, Agent, or Firm* — Sheppard Mullin Richter & Hampton LLP

(57) ABSTRACT

Methods, systems, and apparatus, including computer programs encoded on computer storage media, for automatically adjusting strategies. One of the methods includes: determining one or more characteristics of a plurality of complaints, wherein each of the complaints corresponds to an order; classifying the plurality of complaints into a plurality of categories based on the one or more characteristics by using a trained classifier; selecting a category from the plurality of categories based on a number of complaints in the selected category; from a group of strategies each associated with one or more conditions and one or more actions, identifying a candidate strategy causing the complaints of the selected category, wherein the one or more actions are executed in response to the one or more conditions being satisfied; and optimizing the candidate strategy using a reinforcement learning model at least based on a plurality of historical orders.

18 Claims, 8 Drawing Sheets

(56) References Cited

OTHER PUBLICATIONS

Arivoli et al., Document Classification USing Machine Learning Algorithms, 2017, IJSER, whole document (Year: 2017).*
Ren et al., Reinforcement Learning for On-Demand Logistics, Sep. 2018, DoorDash, whole document (Year: 2018).*
Forster et al., A Cognitive Computing Approach for Classification of Complaints in the Insurance Industry, 2017, AIAAT, whole document (Year: 2017).*

* cited by examiner

SYSTEM AND METHOD FOR AUTOMATICALLY ADJUSTING STRATEGIES

TECHNICAL FIELD

This application generally relates to systems and methods for automatically adjusting strategies.

BACKGROUND

A service provider usually adopts various strategies to customize its services to meet the unique needs and features of individual service orders to provide optimal user experiences. Each service order may be associated with information including customer's profile, type of the service ordered, time of the service to be rendered, duration of the service, and so on. After the requested service orders are fulfilled, the service provider may offer its customers numerous ways to provide feedbacks. Based on the feedbacks, the service provider may periodically adjust the strategies to improve its service qualities. For example, customer service employees of the service provider are often charged with responsibilities such as communicating with customers, collecting feedbacks, summarizing the feedbacks, categorizing each of the feedbacks into predetermined categories based on certain guidelines. Subsequently, the aggregated feedbacks may be analyzed by customer experience specialists to discover the potential connections between the service provider's strategies and the feedbacks. Then the service provider's strategies may be optimized by adjusting the ones causing negative feedbacks (e.g., complaints) and reinforcing the ones leading to positive feedbacks (e.g., compliments). However, this manual process including summarizing and categorizing feedbacks, analyzing connection between feedbacks and strategies, and optimizing strategies is time-consuming, error-prone, and often associated with high labor costs.

SUMMARY

Various embodiments of the specification include, but are not limited to, systems, methods, and non-transitory computer readable media for automatically adjusting strategies.

According to some embodiments, a computer-implemented method for automatically adjusting strategies may comprise: determining one or more characteristics of a plurality of complaints, wherein each of the complaints corresponds to an order; classifying the plurality of complaints into a plurality of categories based on the one or more characteristics by using a trained classifier; selecting a category from the plurality of categories based on a number of complaints in the selected category; from a group of strategies each associated with one or more conditions and one or more actions, identifying a candidate strategy causing the complaints of the selected category, wherein the one or more actions are executed in response to the one or more conditions being satisfied; and optimizing the candidate strategy using a reinforcement learning model at least by changing the one or more conditions of the candidate strategy based on a plurality of historical orders.

In some embodiments, the determining one or more characteristics of a plurality of complaints may comprise, for each of the complaints, using Natural Language Processing (NLP) to: extract one or more first features from a content of the each complaint; extract one or more second features from the order corresponding to the each complaint; and extract one or more third features from a user profile associated with the order corresponding to the each complaint, wherein the one or more characteristics comprise the first, second, and third features.

In some embodiments, the classifier may be trained as using semi-supervised machine learning based on a first plurality of historical complaints with corresponding categorical labels and a second plurality of historical complaints that are not labeled.

In some embodiments, the classifier may comprise an unsupervised machine learning model trained to group the complaints based on vector representations of the one or more characteristics of the plurality of complaints.

In some embodiments, the selecting a category from the categories based on a number of complaints in the selected category may comprise: selecting the category if the number of complaints in the category is greater than a threshold.

In some embodiments, the selecting a category from the plurality of categories based on a number of complaints in the selected category may comprise: selecting the category if an increase of the number of complaints in the selected category during a period of time is greater than a threshold.

In some embodiments, the identifying a candidate strategy causing the complaints may comprise: in response to the complaints complaining about a false positive error, selecting the candidate strategy based on a number of orders that have applied the candidate strategy; and in response to the complaints complaining about a false negative error, selecting the candidate strategy based on a number of orders that have skipped the candidate strategy.

In some embodiments, the one or more conditions may be based on one or more of the following parameters: time of the order, pickup location, and destination.

In some embodiments, the optimizing a candidate strategy using a reinforcement learning model may comprise: building one or more graphs with Monte Carlo Graph Search (MCGS) algorithm based on a plurality of historical orders.

In some embodiments, the optimizing a candidate strategy may comprise: determining a false positive rate and a false negative rate by examining the optimized candidate strategy against the plurality of historical orders, wherein each of the plurality of historical orders is labeled with whether an action associated with the candidate strategy should have been performed.

In some embodiments, the optimizing a candidate strategy may at least lower a false positive rate.

According to other embodiments, a non-transitory computer-readable storage medium is configured with instructions executable by one or more processors to cause the one or more processors to perform: determining one or more characteristics of a plurality of complaints, wherein each of the complaints corresponds to an order; classifying the plurality of complaints into a plurality of categories based on the one or more characteristics by using a trained classifier; selecting a category from the plurality of categories based on a number of complaints in the selected category; from a group of strategies each associated with one or more conditions and one or more actions, identifying a candidate strategy causing the complaints of the selected category, wherein the one or more actions are executed in response to the one or more conditions being satisfied; and optimizing the candidate strategy using a reinforcement learning model at least by changing the one or more conditions of the candidate strategy based on a plurality of historical orders.

According to yet other embodiments, a method of automatically adjusting strategies may comprise: determining one or more characteristics of a plurality of feedbacks, wherein each of the feedbacks corresponds to an order; classifying the plurality of feedbacks into a plurality of categories based on the one or more characteristics using a classifier; selecting a category from the plurality of categories based on a number of feedbacks in the selected category; from a group of strategies each associated with one or more conditions and one or more actions, identifying a candidate strategy resulting in the feedbacks of the selected category, wherein the one or more actions are executed in response to the one or more conditions being satisfied; and in response to the feedbacks of the selected category comprising complaints, optimizing the candidate strategy using a reinforcement learning model at least by changing the one or more conditions of the candidate strategy based on a plurality of historical orders.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

Preferred and non-limiting embodiments of the invention may be more readily understood by referring to the accompanying drawings in which.

DETAILED DESCRIPTION

Figure 1:
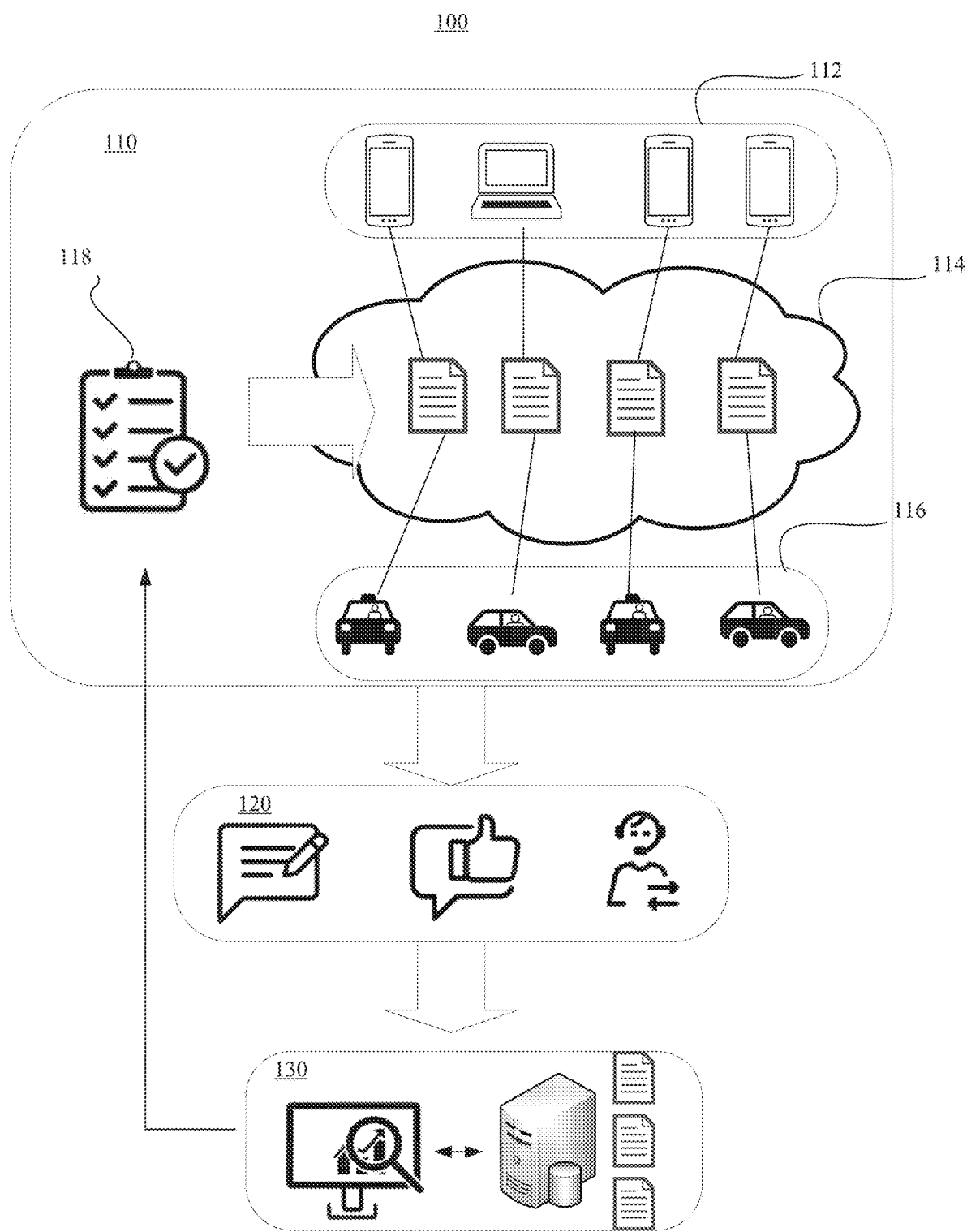
FIG. 1 illustrates an example setup of an environment for automatically adjusting strategies based on feedbacks according to some embodiments.

Specific, non-limiting embodiments of the present invention will now be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

In some embodiments, a service provider may dedicate a great amount of resources to prepare a plurality of strategies in order to provide optimal user experiences. For example, a ride-hailing platform may facilitate transportation service by connecting drivers of vehicles with passengers. The platform may accept requests for transportation from passengers, identify idle vehicles to fulfill the requests, arrange for pick-ups, and process transactions. The platform may create groups of strategies with different focuses, such as order-dispatching strategies to provide effective services and optimize resource utilization and efficiency, driver incentive strategies to enhance driver recruitment, retention, as well as quality of service. In some embodiments, each of the strategies may comprise a plurality of conditions and correspond to one or more actions. Upon the conditions being satisfied, the one or more actions may be performed to adjust the service provider's response to a service order. In some embodiments, each of the plurality of conditions may involve one or more features associated with the service order. For example, a driver incentive strategy of the ride-hailing platform may reward the drivers who have served ten trips in a certain time period. The condition of the strategy may be whether the current order is the ten-th order served by a driver in that time period. Satisfaction of such condition may result in a financial bonus being rewarded to the driver.

In some embodiments, the service provider may establish numerous means for the customers to provide feedbacks regarding the services they received. For example, customers may conduct phone calls or send emails to the customer service department to file complaints. If a non-trivial number of customers are unsatisfied with a specific aspect of the service, these complaints may contain valuable information on why the current strategies are not working properly and how to optimize them. Other example methods for providing feedbacks may include website, online forum, in-app self-help functionality, social media (e.g., a service provider may have official account to communicate with customers), another suitable method, or any combination thereof.

In some embodiments, a computing system associated with the service provider may be used to categorize the collected feedbacks received from the customers. For a service provider actively serving millions of users (e.g., a ride-hailing platform) on daily basis, the number of feedbacks or complaints to be categorized and analyzed may be enormous, which makes it impractical to carry out the task without implementation using computer technologies. In some embodiments, the categorization process may group the feedbacks addressing the same or similar issues regarding the service using natural language processing (NLP) and machine learning (ML). In some embodiments, in order to accurately categorizing the feedbacks, the service provider may extract features from the content of each of the feedbacks, as well as other information associated with each of the feedbacks, such as the service order, customer profile, profile of the personnel provided the service to the customer. After the categorization process, the service provider may obtain a plurality of feedback categorizations, with each categorization comprising a plurality of feedbacks. In some embodiments, the service provider may link the feedbacks of each category to the corresponding service orders and then proceed with an analysis of the trend of the number of service orders being complained or complimented within each of the categories.

In some embodiments, the computing system associated with the service provider may select one or more popular categories to learn insights (e.g., the causes of the complaints, the reasons for positive user experience). For example, the first five categories with the highest numbers of complaints may be picked. In some embodiments, the specific issue reported by the feedbacks of a category may be linked to one or more strategies applied to the service orders associated with the category. In some embodiments, the computing system may use ML models to explore optimizations to these strategies.

FIG. 1 illustrates an example setup of an environment for automatically adjusting strategies based on feedbacks according to some embodiments. The environment 100 may comprise a service platform 110 providing services to customers, a feedback collection system 120 for collecting feedbacks from the customers regarding the services they received, and a computing system 130 for analyzing the received feedbacks and optimizing strategies. In some embodiments, one or more of the systems may be merged or split depending on specific configurations. For example, one of the feedback collection system 120 or the computing system 130 may be integrated into the service platform 110.

In some embodiments, the service platform 110 may offer ride-hailing services for riders and drivers. The riders may use various user interface devices 112 to make transportation orders 114 to the service platform 110. An order may refer to a transportation request made by a rider and accepted by a driver. In some embodiments, an order may be cancelled before starting, unfinished, unpaid, or completed. Examples of the user interface devices 112 may include phones, computers, tablets, smart devices (e.g., digital personal assistants, AI-enabled home appliances), another suitable device that may communicate with the service platform 110, or any combination thereof. The service platform 110 may dispatch the orders 114 to available drivers 116, who may eventually provide the transportation services to the riders. During the order-dispatching process, the service platform may apply a list of strategies 118 to each of the orders. Each of the strategies may comprise one or more conditions and a corresponding action. If features of an order (e.g., current time, location, destination, user's profile, special request) and its associated information (e.g., traffic condition, driver's location, condition of the driver's vehicle) satisfy the one or more conditions, the strategy may be applied to the order and the corresponding action may be performed. Otherwise, the strategy may be dropped by the order, and the action may be skipped. For example, a strategy may comprise the following conditions: (if a driver is within 10 miles from the pickup location) and (if a driver can arrive at the pickup location within 15 minutes), and the corresponding action is (dispatching the order to the driver to accept).

In some embodiments, the feedback collection system 120 may be implemented in various forms, such as emails, in-app messages, questionnaires, forums, social media, voice messages, system health monitors, another suitable way, or any combination thereof. For example, the feedback collection system 120 may collect feedbacks from users (e.g., riders and drivers in the context of ride-hailing services), or generate feedbacks based on observations (e.g., using a system health monitor to monitor transaction reliability or service qualities, such as service shutdown time and frequency, or application/website crashes). The feedback collection system 120 may collect feedbacks from the sources periodically or continuously. In some embodiments, the feedbacks may go through one or more filtering processes to eliminate scams before being sent to the computing system 130. In some embodiments, the feedbacks may comprise complaints from discontented riders or drivers. For example, a rider may complain that the waiting time for pickup was too long (e.g., 30 minutes), or a driver may complain that it took him 1 hour to drive to the pickup location. In some embodiments, the feedbacks may also comprise compliments on positive user experiences. For example, a rider or a driver may grade five stars to a new user interface for its responsiveness and aesthetics.

In some embodiments, the computer system 130 may perform feedback categorization using NLP and ML based on information associated with the feedbacks. For example, in a ride-hailing service context, the information may comprise the titles and text bodies of the feedbacks, information of orders associated with the feedbacks (e.g., timestamp of the order, pickup location, destination), user profiles (e.g., riders' profiles, drivers' profiles) associated with the orders, other suitable information, or any combination thereof. The feedbacks focusing on the same or similar aspect of the service may be grouped into the same category. In some embodiments, the computer system 130 may select one or more candidate categories for further processing according to various criteria. For example, the computer system 130 may select the top five feedback categories with the highest number of complaints. As another example, the computer system 130 may select feedback categories with the fastest increases of the number of complaints. Yet another example, certain categories may be assigned with higher priorities compared to others, and the computer system 130 may pick candidate categories from the ones with high priorities.

In some embodiments, after selecting the candidate categories, computer system 130 may determine the strategies causing the feedbacks in each of the candidate categories. In some embodiments, the strategies 118 used by the service platform 110 may target different aspects of the service, such as order dispatching, driver incentive, routing determination, fee calculation, another suitable aspect of the service, or any combination thereof. Since the feedbacks categorized into the same candidate strategy may likely focus on the same aspect of the service, the computing system 130 may identify the candidate strategies caused the feedbacks. For example, a category of feedbacks comprising complaints regarding long waiting time for pickups at airport may be linked to order-dispatching strategies applicable to airport pickup orders.

In some embodiments, if the feedbacks in a candidate category are complaints, the computing system 130 may optimize the strategies causing the complaints. The optimization may comprise changing the conditions involved in the strategies in various ways, including adding new conditions, removing certain conditions, updating existing conditions, another suitable way, or any combination thereof. In some embodiments, each of the conditions involved in a strategy may be mapped to one of the features associated with an order. The features may comprise timestamp of the order, pickup location, destination, rider's location and driver's location at the time when the order was made, rider's email, another suitable feature, or any combination thereof. In some embodiments, the computing system 130 may use an ML model to perform the strategy optimization. In some embodiments, the machine learning model may use supervised learning based on historical order data with appropriate labels. In some embodiments, the computing system 130 may deploy the optimized strategies to the service platform 110. In some embodiments, if the feedbacks in a candidate category are compliments appraising certain aspects of the service, the computer system 130 may determine the strategies and the relevant conditions that resulted in the positive user experience and may propagate the beneficial conditions to other strategies.

Figure 2:
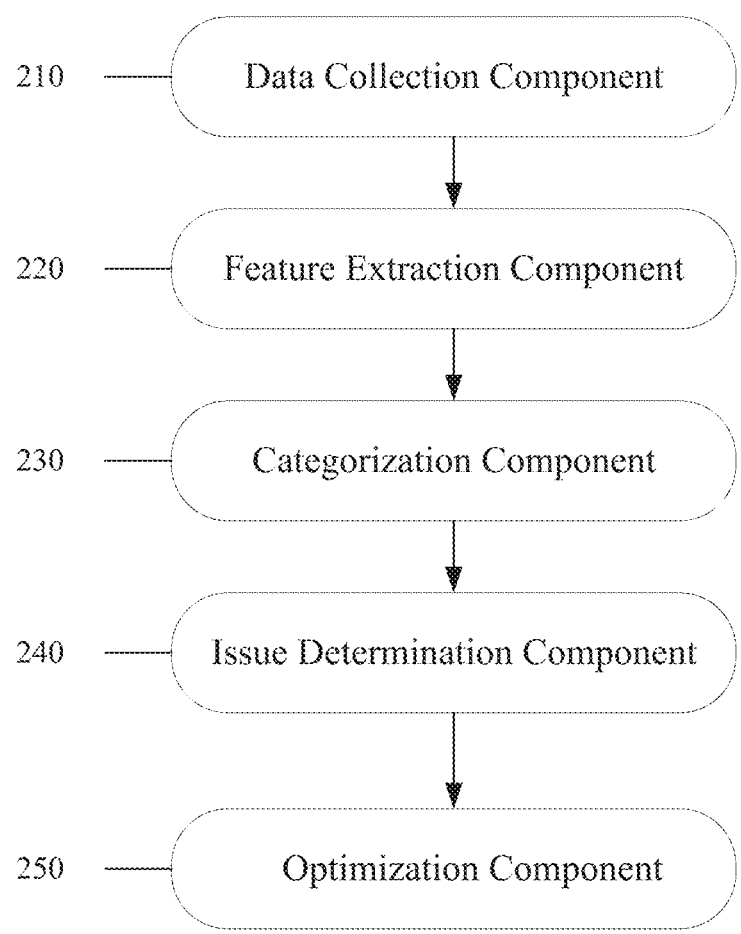
FIG. 2 illustrates a system for automatically adjusting strategies based on feedbacks according to some embodiments.

FIG. 2 illustrates a system for automatically adjusting strategies based on feedbacks according to some embodiments. The system 200 may be implemented using one or more computing devices with processors and memories (e.g., the computing device shown in FIG. 8). The system 200 may comprise a data collection component 210, a feature extraction component 220, a categorization component 230, an issue determination component 240, and an optimization component 250. In some embodiments, one or more of the components may be split or merged. For example, the data collection component 210 may be merged with the feature extraction component 220. In some embodiments, the issue determination component 240 may be split into a component identifying candidate categories and a component identifying candidate strategies leading to the feedbacks in the candidate categories. In some embodiments, more components may be added to the system 200 such as a component managing deployment of the optimized strategies.

In some embodiments, the data collection component 210 may collect user feedbacks from various sources regarding services the users received. For example, a user may file complaints to a service provider's official social media account (such as Facebook, twitter). As another example, if the user ordered his services through a website portal or an application on a smart phone, he may create complaints on the website or using an in-app functionality. As yet another example, the user may be offered questionnaires by emails, in-app messages, SMSs, hard copies, to solicit feedbacks regarding the received services. Each questionnaire may comprise multiple questions to measure user experience. Based on the user's answers to these questions, a Net Promoter Score may be determined to reflect whether the user's experience is positive or negative, and other detailed information may also be collected (e.g., the specific reasons caused negative scores). In some embodiments, the data collection component 210 may also collect information regarding transaction reliability or service level agreement (e.g., service shutdown durations and frequency, application crashes). In some embodiments, preliminary scam filtering may be performed against the complaints collected from the sources. For example, a complaint associated with a bogus email address (e.g., with certain characteristics or preknowledge from machine learning classification) may be determined as a scam and filtered out. In some embodiments, the feedbacks may be generated by data collection component 210 based on observations on transaction reliability or service level agreement features, such as service shutdown time, application crashes, another type system health issue, or any combination thereof.

In some embodiments, the feature extraction component 220 may extract features from information associated with each of the feedbacks. The information may comprise title, content, time stamp, customer's email address, etc. of the feedback, a service order associated with the feedback, a profile of the customer filing the feedback, a profile of the personnel provided the service, another suitable information, or any combination thereof. In some embodiments, feedbacks in audio or video format may be converted into text, preprocessed matrices, or structured data in order to facilitate feature extraction. In some embodiments, the information associated with each feedback may be represented in the form of a vector through Vector Space Modelling (VSM). For example, the VSM may be implemented by a Bag of Words approach using Term Frequency-Inverse document frequency (TF-IDF). As another example, the VSM may be implemented using word embedding tools, such as doc2vec.

In some embodiments, the categorization component 220 may group the feedbacks into categories based on their vector representations. The distance (e.g., Euclidean Distance, Cosine Distance, Jaccard Similarity) between vectors representing feedbacks that report the same or similar issues may be close and therefore the corresponding feedbacks may be grouped into the same category. In some embodiments, a service provider may have a number of predetermined categories as well as training cases as ground truth in each category. Each of the categories may focus on one specific issue. As a result, the categorization component 220 may assign the feedbacks reporting the specific issue into the corresponding category. The feedbacks not belonging to the predetermined categories may result in new categories being created. In some embodiments, the categorization component 220 may use various machine learning (ML) methods to perform the categorization, such as supervised learning based on a labeled training dataset, (e.g., historical complaints), and a testing dataset (e.g., new complaints) or known complaints (e.g., to assess the reliability of the machine learning algorithm), semi-supervised learning (based on a training dataset with a small amount of labeled data and a large amount of unlabeled data), unsupervised learning, reinforcement learning, other suitable ML methods, or any combination thereof.

In some embodiments, some categories may be determined as more popular than others according to various factors, such as the number of feedbacks received, the growing speed of the number of feedbacks within a predetermined period of time, another suitable factor, or any combination thereof. In some embodiments, the factors may be weighted based on the priorities assigned to the categories. In some embodiments, the issue determination component 240 may first select one or more of the popular categories as candidate categories. For example, the top five categories with the highest number of complaints may be selected. In some embodiments, for each of the candidate categories, the orders associated with the feedbacks in the category may be obtained. For example, customers usually file complaints after they receive the services (e.g., after the service orders have been fulfilled), and the corresponding service orders may be stored in and retrieved from a server of the system 200.

In some embodiments, each of the orders associated with the feedbacks of a candidate category may, at the time when it was made, have examined a list of strategies and applied the applicable ones. A strategy (e.g., an applied strategy or an omitted strategy) may impact how the order was served. For example, a poorly designed ride-hailing order dispatching strategy may cause a rider to wait for an extended period of time for pickup, or an unfair driver's incentive strategy may cause frustration among drivers. In some embodiments, the issue determination component 240 may identify one or more strategies that have caused the feedbacks associated with the candidate categories. In some embodiments, if the feedbacks are complaints, the corresponding strategies may be selected as the candidate strategies for optimization.

In some embodiments, the optimization component 250 may optimize each of the candidate strategies identified by the issue determination component 240. One candidate strategy may comprise one or more conditions connected by logical operators (such as "and, or, not, nand, nor, xor, xnor"). In some embodiments, the candidate strategy may be applied to already-served orders. For example, an anti-fraud strategy may be applied to determine the legitimacy of an already-served order. In this case, the conditions in the anti-fraud strategy may comprise determinations based on one or more features of the already-served orders. In some embodiments, the candidate strategy may be applied in real-time to respond to service requests, or during the service of the requests (e.g., an order-dispatching strategy, a map routing strategy). These real-time strategies may have higher performance requirement for data flow, feature generation, and decision making. In this case, the conditions may comprise one or more features associated with the service requests. For example, a ride-hailing request may comprise features such as timestamp, pickup location, destination, driver's current location, user profiles (e.g., riders' profiles, drivers' profiles), number of seats requested, special requests (e.g., car seat, wheelchair lift), another suitable feature, or any combination thereof. the candidate strategy may be an order-dispatching strategy comprising a condition associated with the distance between the pickup location and the driver's current location.

In some embodiments, one candidate strategy may be optimized by adding a condition, removing a condition, updating one or more existing conditions, another suitable operation, or any combination thereof. In some embodiments, the optimization process may be implemented using various machine learning methods, such as supervised learning, semi-supervised learning, supervised learning, reinforcement learning, another suitable machine learning method, or any combination thereof. In some embodiments, quality of the updated strategy may be measured by various methods, such as false positive rate, false negative rate, or a combination thereof. For example, the updated strategy may be examined against a plurality of history orders, each of which may have been properly labeled (e.g., the label may indicate whether the action associated with the strategy should be applied to the order or omitted). If the false positive rate and false negative rate produced by the updated strategy satisfy one or more predetermined conditions, the strategy may be deemed optimized and deployed (e.g., by replacing the candidate strategy).

Figure 3:
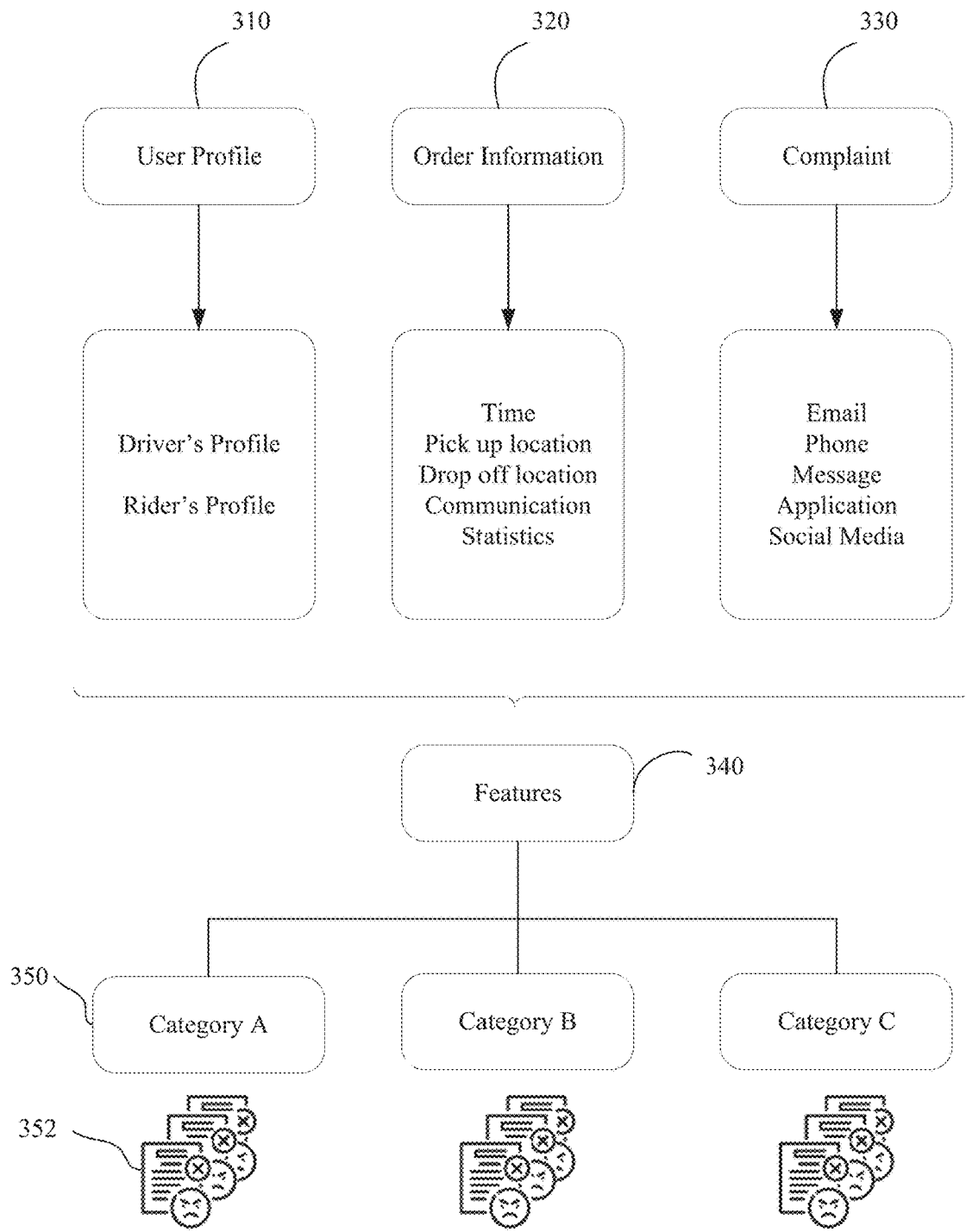
FIG. 3 illustrates an example system for categorizing feedbacks according to some embodiments.

FIG. 3 illustrates an example system for categorizing feedbacks according to some embodiments. In some embodiments, feedbacks received from users of a service (or a product) may be negative (e.g., complaints) or positive (e.g., compliments). The negative feedbacks may potentially be mined by a computing system to identify the root causes (e.g., inaccurate strategies used by the service provider) of the users' frustration, and eventually lead to adjustments and optimizations. The positive feedbacks may also be studied by a computing system to determine the reasons (e.g., appropriate strategies) behind the appraises, which may be adopted by other strategies. For example, if a ride-hailing order-dispatching strategy works well for airport pickups during rush hour, the conditions involved in the strategy may be transplanted to an order-dispatching strategy for pickups at stadium events.

The system 300 shown in FIG. 3 uses a ride-hailing platform as an example and focuses on negative feedbacks (e.g., complaints, questionnaires with poor scores). In some embodiments, the system 300 may also apply to other platforms and general feedbacks. In some embodiments, the system 300 may perform feature extraction and classification on information associated with the complaints received by the platform. For example, the information associated with a complaint may comprise a user profile 310, an order information 320, the complaint itself 330, another suitable information, or any combination thereof. The user profile 310 may further comprise the driver's profile (e.g., number of rides served, years of driving experience, ratings, contact information, vehicle information) and the rider's profile (e.g., number of rides ordered, age, gender, email, phone). In some embodiments, private information in the driver's profile may be encrypted or hashed to prevent the information from being accessed by malicious parties while maintaining accurate representation of the private information. For example, gender, email, phone number may be hashed using a one-way obfuscation technique (e.g., Salted SHA256 algorithm). The order information 320 may further comprise time of the order, the pickup location, the drop off location, the determined routing, the estimated duration and cost, the actual trip information appended to the order after the trip is served (e.g., the actual routing, departure, destination, duration, cost), the communication between the rider and driver (e.g., in-app message exchange, SMS, phone calls, in-car conversation), another suitable information, or any combination thereof. The complaint 330 may be received from various sources, such as email, phone, message, in-app interface, social media, another suitable source, or any combination thereof. The complaint 330 may comprise title, body content, timestamp, contact information (e.g., email, phone number).

In some embodiments, the system 300 may extract features 340 from the information associated with a complaint, and categorize the complaint based on the extracted features. In some embodiments, the large volume of data to be analyzed may require the feature extraction task to be implemented using machine learning models. The feature extraction may be accomplished using various machine learning methods and tools, such as supervised learning (e.g., TF-IDF, doc2vec), reinforcement learning (e.g., Monte Carlo Graph Search or Monte Carlo Tree Search), semi-supervised learning, reinforcement learning, another suitable way, or any combination thereof. For example, TF-IDF may be used to convert the textual representation of the information associated with a complaint into a Vector Space Model (VSM), or into sparse features, by extracting important features (e.g., ignoring stop words like "the, is, at, on"). As another example, doc2vec using multiple layers of shallow deep neural network may be adopted to gauge the context of the textual information associated with the complaint and relate similar context phrases together. In some embodiments, these machine learning methods may be trained on quality datasets to generate sensible embeddings and accurate feature extractions.

In some embodiments, historical complaints may be processed to form a sizable training dataset to train a machine learning model. In some embodiments, when a complaint is received, a customer service agent may manually label it to one of predetermined categories according to certain guidelines. In some embodiments, the accuracy of the manual labeling may not be ideal but may be improved by one or more extra rounds of auditing or manual examinations. When the number of complaints is beyond a point that may render auditing or manual examination infeasible, some embodiments may adopt solutions such as semi-supervised learning. The training data of the semi-supervised learning may comprise a small amount of data with proper labels and a large amount of data without labels. The acquisition of labeled data may require skilled human agents while the acquisition of unlabeled data may be relatively inexpensive. For example, the system 300 may dedicate certain manual resources to carefully label a small portion of the historical complaints, which may be used as the labeled training data.

Then the system 300 may retrieve more historical complaints as the unlabeled training data. These two sets of training data may be used to implement the semi-supervised learning using various methods, such as generative models, low-density separation, graph-based methods, heuristic approaches (e.g., self-training, co-training). For example, if the labeling accuracy of one million historical complaints is 60%, the system 300 may pick ten thousands of the labeled complaints and feed them to a group of skilled human agents to identify the six thousands of the labeled feedbacks with a higher accuracy, e.g., 95%. Then the system may use the six thousands of properly labeled complaints (with 95% of accuracy) to train a classifier and apply it to the rest of the historical complaints to generate more labeled examples with accuracy higher than 60%.

In some embodiments, with the help of a well-trained classifier, the complaints may be grouped into a list of categories 350. In some embodiments, the list of categories 350 may be predetermined by the system. For example, a service provider may have already defined two thousands categories. In some embodiments, when certain complaints may not be categorized into one of the predetermined categories, a new category may be created and added to the pool of categories. In some embodiments, after the categorization process, a category 350 may comprise a plurality of complaints 352.

Figure 4:
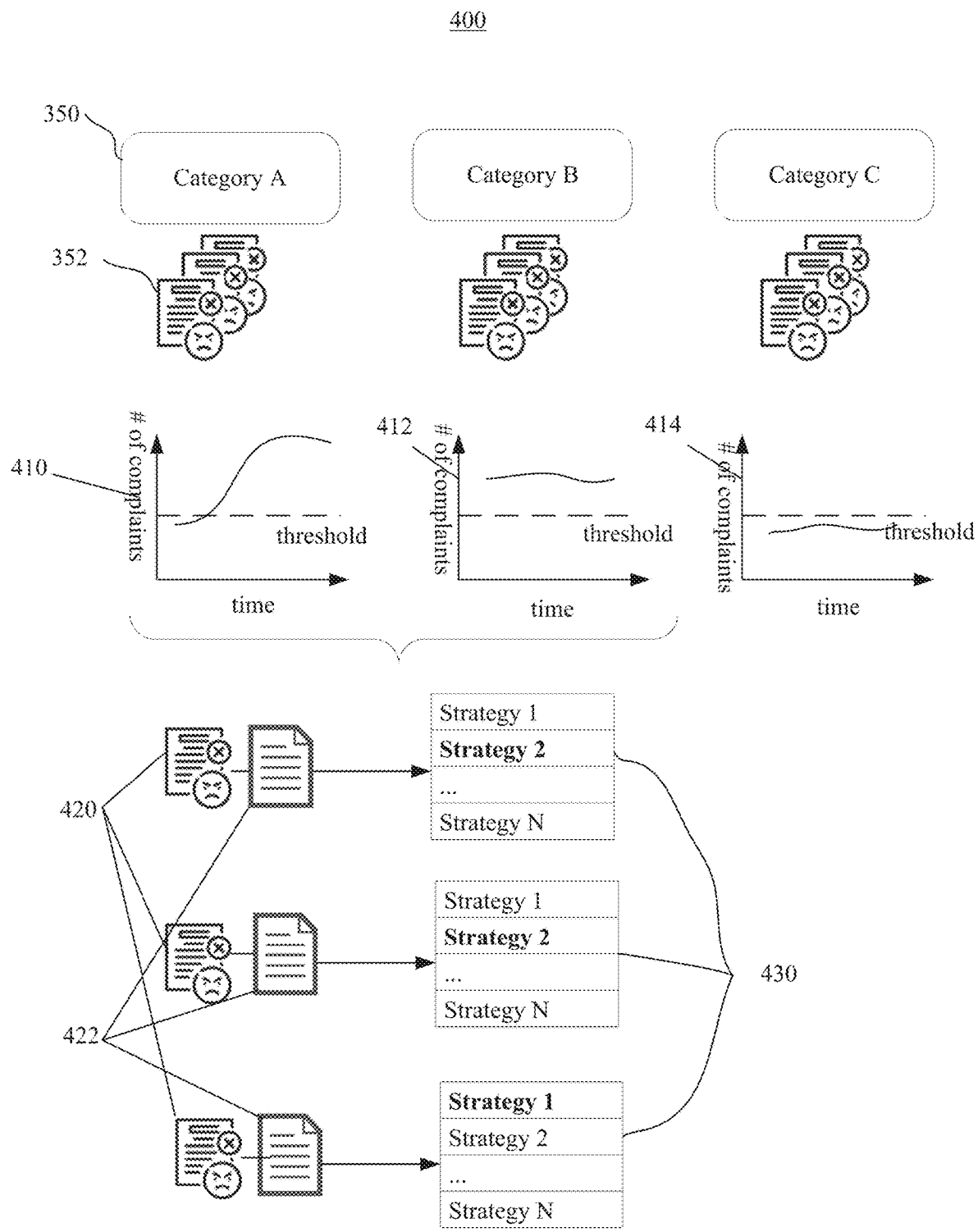
FIG. 4 illustrates an example system for identifying candidate strategies for optimization according to some embodiments.

FIG. 4 illustrates an example system for identifying candidate strategies for optimization according to some embodiments. After the complaints are categorized, in some embodiments, the system 400 may identify a number of popular categories as the candidate categories. The determination of a category's popularity may be measured by various criteria, such as the number of complaints in the category, the growing speed or trend of the number of complaints in the category, a predetermined priority associated with the category (e.g., the category comprising complaints about a specific driver charging extensive fees may be assigned a higher priority than the category comprising complaints about another specific driver being over-chatty), another suitable criterion, or any combination thereof. In some embodiments, the system 400 may generate trend graphs 410, 412, and 414 (e.g., using curves, bars, pies, another suitable way, or any combination thereof) for the categories in order to determine the candidate strategies for optimization. For example, the graph 410 shown in FIG. 4 may indicate that the number of complaints of category A has been increasing significantly recently, and therefore category A may be identified as a candidate category. As another example, the graph 412 may indicate the number of complaints of category B has been consistently exceeding a predetermined threshold for a period of time, and thus category B may be identified as a candidate category in some embodiments. For yet another example, the graph 414 shown in FIG. 4 may indicate the number of complaints associated with category C is below a predetermined threshold, and therefore category C may not be identified as a candidate category.

In some embodiments, some complaints 420 in a candidate category may correspond to service orders 422, such as the complaints filed by users after their service orders being served. In some embodiments, when a computing system associated with the ride-hailing platform receives an order, it may examine the order against a group of predetermined strategies 430 and apply the applicable ones. In some embodiments, the strategies 430 may focus on various aspects of the service to be provided, such as order-dispatching in airports, order-dispatching in suburban areas, driver's incentives, another suitable aspect, or any combination thereof. In some embodiments, the complaints may be caused by poorly designed strategies producing false positives and/or false negatives. For example, an order dispatching strategy may determine "if the distance between the pickup location and a driver's current location is less than ten miles, dispatch such order to the driver." However, this strategy may fail to consider the traffic condition at the time of pickup. During a rush hour, it may take a long time for the driver to pick up the rider ten miles away. Therefore, this strategy may produce false positives (e.g., the strategy may have incorrectly determined that the order should be dispatched to a driver). In some embodiments, some complaints 420 in a candidate category may be obtained from data sources such as user questionnaires. For example, the ride-hailing platform application installed on a user's smartphone, tablet, or computer may offer questionnaires to the user to solicit feedbacks. Each questionnaire may comprise multiple questions to measure user experience. Based on the user's answers to the questionnaire, a Net Promoter Score may be determined to reflect whether the user's experience is positive or negative, and other detailed information may also be collected (e.g., the specific reasons caused the negative user experience). In some embodiments, the questionnaire may be designed to measure user experience with regarding to a specific feature or strategy. For example, a driver's incentive strategy may reward a driver for serving more than ten trips. After being deployed, this strategy may be evaluated based on the corresponding questionnaires collected from drivers. In response to the feedback (e.g., evaluation) being negative, this strategy may be found as defective as it fails to consider the distances and/or durations of the trips (e.g., a driver served seven long trips may be more deserving the reward than a driver served ten short trips) when determining the rewards. Therefore, this strategy may result in false negatives (e.g., the strategy may have incorrectly determined that a bonus should not be rewarded to a driver).

In some embodiments, the complaints in each of the candidate categories may focus on one or more specific service quality issues. In some embodiments, these specific service quality issues may be mapped to the corresponding strategies. For example, the issue of long pickup-waiting-time at airport may be mapped to airport order-dispatching strategies, the issue of insufficient or unfair reward for driver may be mapped to driver's incentive strategies. In some embodiments, the mapping between the service quality issues and the strategies may not be a strict 1 to 1 mapping, but instead, one strategy may be loosely mapped to a plurality of service quality issues (e.g., complaints). In some embodiments, the system 400 may identify the strategies relevant to the complaints in a candidate category based on the mapping. These relevant strategies may be the candidate strategies to be optimized.

Figure 5:
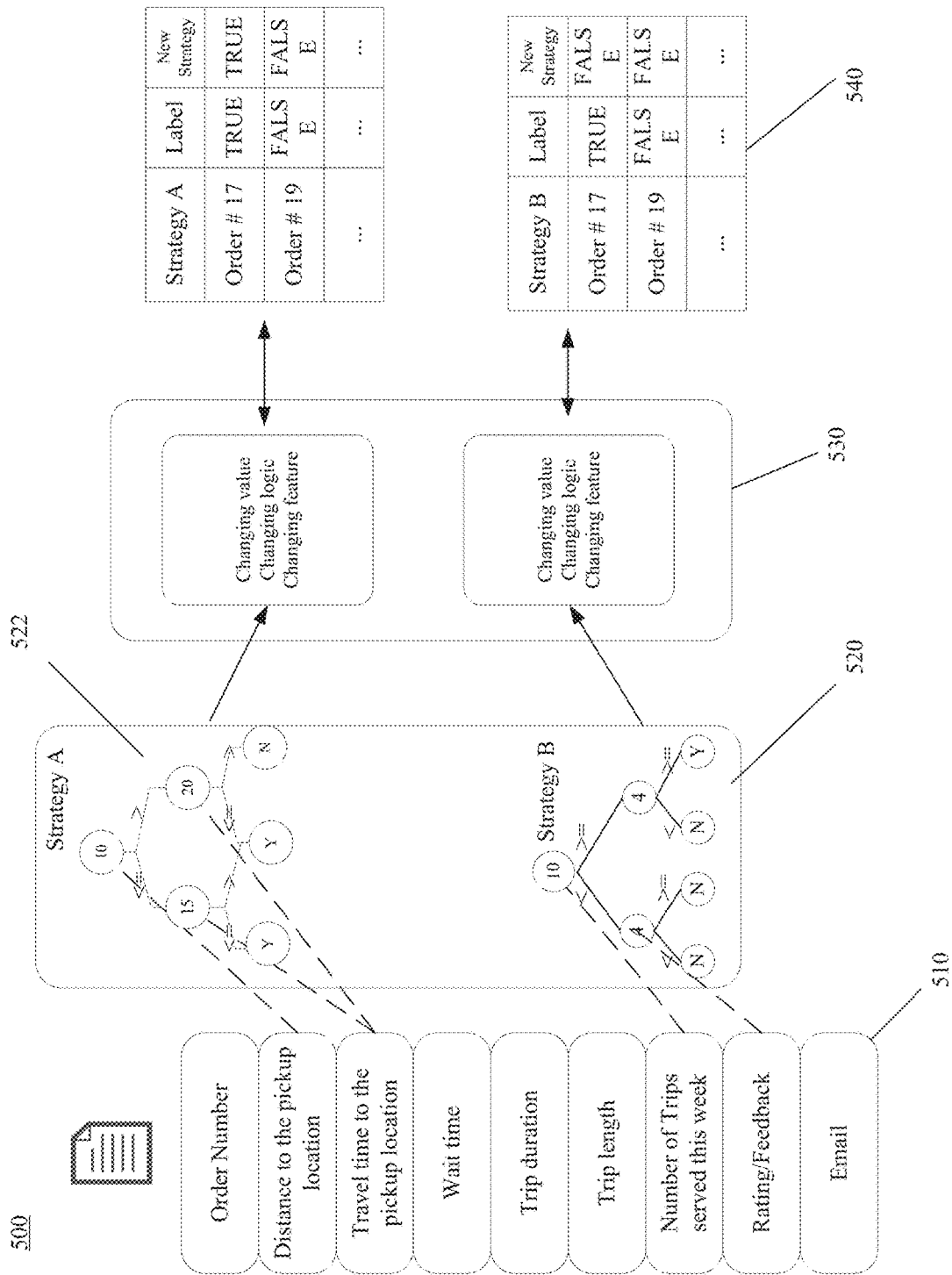
FIG. 5 illustrates an example system for optimizing a candidate strategy according to some embodiments.

FIG. 5 illustrates an example system for optimizing a candidate strategy according to some embodiments. In some embodiments, a strategy may comprise one or more conditions corresponding to one or more features 510 of orders. When an order is examined against the strategy, the strategy may be applicable if the order's features satisfy the conditions of the strategy. For example, a simple order-dispatching strategy may determine "if the distance from the driver's current location to the pickup location is less than ten miles, dispatch the order." In this case, the condition relies on the feature "distance between the driver's current location and the pickup location" associated with an order. In some embodiments, the conditions of a strategy may be connected by logical operators such as "and," "or," "not," "nand," "nor," "xor," "xnor," another suitable operator, or any combination thereof. For example, a driver's incentive strategy may reward a driver for meeting either one of the following two conditions: "serving more than ten trips within a day," or "receiving seven five-stars reviews in a row."

In some embodiments, a strategy may be represented as a decision graph or a decision tree depending on the types of logical connecters connecting the conditions of the strategy. A decision tree is an exemplary format of a decision graph (e.g., a decision tree may not have loops, circuits and self-loops). In some embodiments, each of internal nodes (e.g., in contrast to leaf nodes) in the decision graph may represent a determination on a feature of an order, each of the branches may represent an outcome of the determination, and each of the leaf nodes may represent a class label (e.g., whether the strategy should be applied or omitted). For example, in a decision graph representing a strategy rewarding drivers for serving more than ten trips within a day, an internal node of the decision graph may represent a determination of "if this is the trip number ten for this driver today." The node may grow out two branches representing the true or false outcomes of the determination, which may point to two leaf nodes representing "a reward should be provided" and "a reward should not be provided yet," respectively.

In some embodiments, if the conditions of a strategy are connected only by "and" operators, the strategy may be represented as a decision tree 520. If some of the conditions of a strategy are connected with "or" operators, the strategy may be represented as a decision graph 522. For example, an order dispatching strategy A shown in FIG. 5 may comprise the following conditions connected by "and" and "or" operators. The corresponding decision graph may be generated as 522 in FIG. 5.
boolean determination (whether an order should be dispatched to the driver):
   distance=distance from the driver's current location to the pickup location
   time=travel time from the driver's current location to the pickup location
   if (distance<=10 miles and time<=15 minutes) return TRUE
   if ((distance<=10 miles and time>15 minutes) or (distance>10 miles and time<=20 minutes)) return TRUE
   if (distance>10 miles and time<20 minutes) return FALSE
As another example, a driver incentive strategy B shown in FIG. 5 may comprise the following conditions connected by "and" operators. The corresponding decision graph may be generated as 520 in FIG. 5.
boolean determination (whether a bonus should be rewarded to the driver):
   trips=number of trips served in past 7 days
   rating=average rating in the past 7 days
   if (trips>=10 and rating>=4 stars) return TRUE
   else return FALSE In some embodiments, a strategy may be optimized with various operations. The operations may comprise changing (e.g., adding, removing, replacing) a condition associated with a feature, changing logic connectors between multiple conditions, changing a feature involved in the strategy, another suitable operation, or any combination thereof. For example, an operation may change the condition "distance<=10 miles" of strategy A in FIG. 5 to "distance<=8 miles" in order to further reduce the pickup-waiting-time. As another example, an operation may change the logic connector (e.g., from "and" to "or") and the condition (e.g., from ">=4 stars" to ">=4.5 stars") of strategy B to adjust the incentive strategy. Yet another example, a new condition based on email addresses may be added to strategy B to filter out scam accounts.

In some embodiments, the system 500 may use machine learning algorithms to learn the optimized strategies. In some embodiments, the system 500 may use reinforcement learning such as Monte Carlo Graph Search (MCGS) algorithm to search for the optimal decision graphs, or build multiple candidate decision graphs (e.g., each graph corresponding to a new strategy) and pick the one with the highest quality. The quality of a decision graph may be measured by running it against a plurality of historical orders with proper labels and comparing the produced decisions against the labels to determine the false positive rate and false negative rate (e.g., using the table 540 in FIG. 5). For example, in order to measure the quality of an order-dispatching strategy, a plurality of historical orders may be selected as testing data and sent to human agents to apply proper labels, such as "TRUE" (e.g., the order was correctly dispatched to the driver who served the order) or "FALSE" (e.g., the order was incorrectly dispatched to the driver). When examining the decision graph against these historical orders, the determinations generated by the decision graph may be compared against the labels assigned to these orders to determine the false positive rate and false negative rate. As another example and alternatively, the system 500 may select a first set of historical orders received complaints about the order-dispatching decisions, and a second set of historical orders comprise orders received positive Net Promoter Score from the riders, orders served by drivers arrived the pick-up location within the fastest $90^{th}$ percentile, orders received positive feedbacks, orders didn't receive complaints, other types of orders, or any combination thereof. The system 500 may then automatically label the orders in the first set as "FALSE" (e.g., the orders were incorrectly dispatched) and the orders in the second set as "TRUE" (e.g., the orders were correctly dispatched because no complaints were received). In some embodiments, the system 500 may use another suitable way to label the testing data, such as self-training or co-training methods in semi-supervised learning algorithm, another suitable way, or any combination thereof. In some embodiments, the system 500 may select one decision graph from the candidate decision graphs as the optimized strategy based on various criteria, such as the one with the lowest false positive rate, the one with the lowest false negative rate, the one with the lowest false positive rate and a reasonably low false negative rate, another suitable criterion, or any combination thereof.

In some embodiments, the system 500 may use the historical orders with proper labels (e.g., the training data and/or the testing data) to build the optimal decision graph representing the optimal strategy. The process may start with picking the best "decision stump" with the most informative feature of the orders. In some embodiments, picking the best "decision stump" may be implemented by various methods, such as building a decision stump for each possible feature and determine which one achieves the highest accuracy on the training data, or using information gain to measure how much more organized orders in the training data have become when divided using a given feature. In some embodiments, the system 500 may use reinforcement learning (RL) to approximate the optimal strategy. The RL model may define its state as the strategy to be optimized, and a set of actions with the possible optimization operations comprising changing a condition associated with a feature, changing a logic between multiple conditions, changing (e.g., adding, removing, replacing) a feature involved in the strategy, another suitable action, or any combination thereof. The RL model may train itself using the historical orders with proper labels. In some embodiments, the system 500 may use a neural network or one of its variants to optimize the strategy based on the training data with proper labels.

In some embodiments, an optimized strategy may be required to meet certain criteria in order to be adopted and actually deployed. For example, the optimized strategy may be tested against a set of known testing data (e.g., historical orders), and the produced false positive rate, false negative rate, or a combination thereof, may be required to be lower than predetermined thresholds. In some embodiments, false positive rate may be assigned higher priority than false negative rate. For example, among multiple candidates, the one with the lowest false positive rate and a reasonable false negative rate may be selected over another one with a higher false positive rate and a lower false negative rate.

Figure 6:
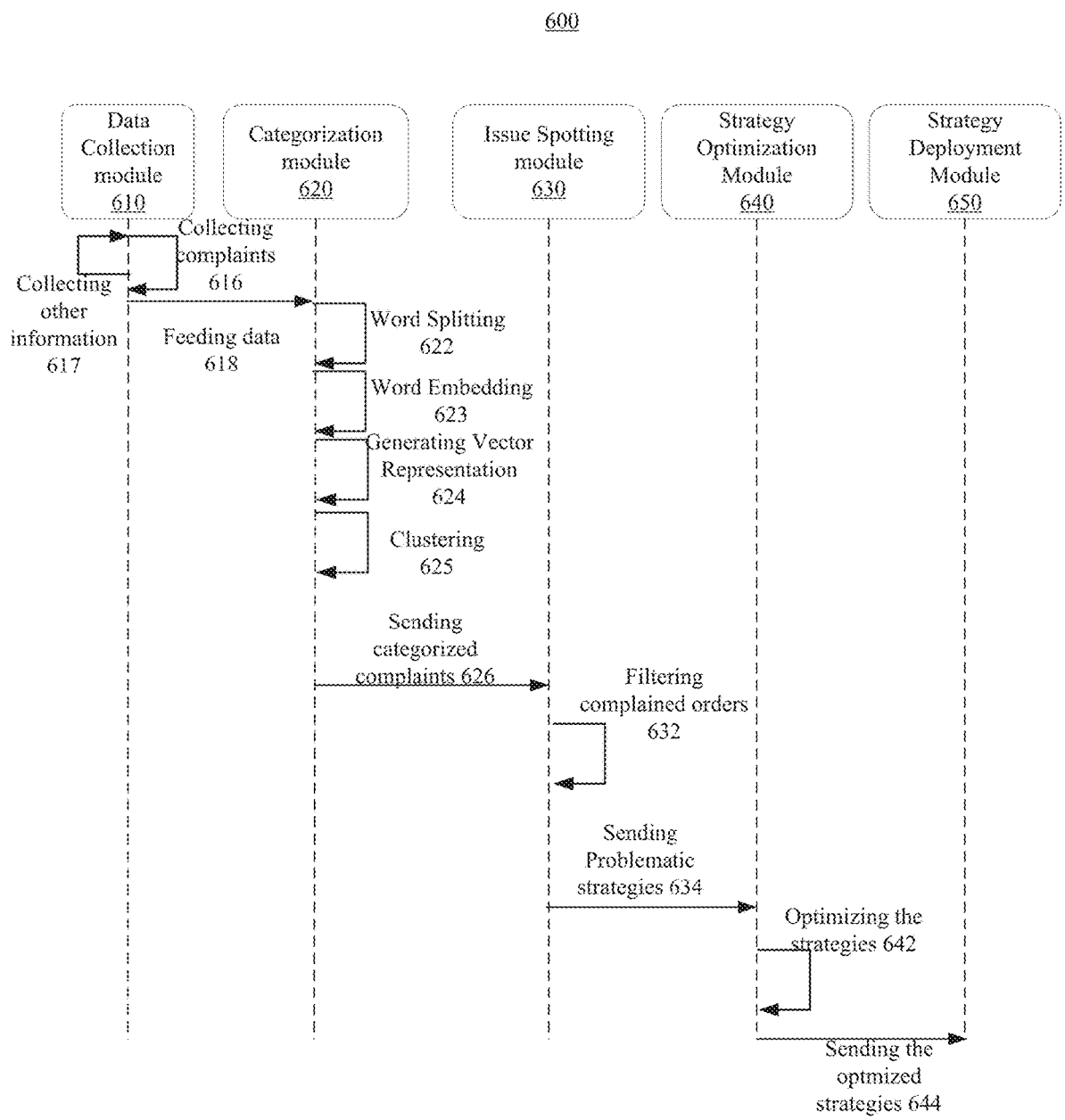
FIG. 6 illustrates an example method for automatically adjusting strategies based on feedbacks according to some embodiments.

FIG. 6 illustrates an example method for automatically adjusting strategies based on feedbacks according to some embodiments. The method 600 shown in FIG. 6 may be implemented using one or more computing devices with processors and memories (e.g., the computing device shown in FIG. 8). The method 600 uses a ride-hailing platform as an example and focuses on negative feedbacks (complaints). In some embodiments, the method 600 may apply to other platforms and general feedbacks. The method 600 may start with a data collection module 610 collecting complaints at step 616. In some embodiments, the complaints may be collected from various sources such as emails, phones, messages, in-app self-help portals, forums, social media, user questionnaires, another suitable source, or any combination thereof. In some embodiments, some of the complaints may be associated with specific orders (e.g., higher than reasonable fee charged for a trip, a bad routing for a trip), while others may be generic complaints not associated with an order (e.g., the user interface of the mobile application not being intuitive). In some embodiments, besides the complaints themselves, the data collection module 610 may also collect other information associated with the complaints at step 617, such as information of the orders associated with the complaints (e.g., time, pickup location, destination), user profiles (e.g., riders' profiles, drivers' profiles) associated with the orders, other suitable information, or any combination thereof.

In some embodiments, data collected by the data collection module 610 (e.g., the complaints and corresponding information) may be fed to a categorization module 620 at step 618. In some embodiments, the categorization module 620 may build a classifier to group the complaints criticizing the same or similar issues to the same category. For example, the data associated with each complaint may be processed by natural language processing (NLP), such as feature extraction (e.g., using TF-IDF, or doc2vec) and classification based on the extracted features. Specifically, the data associated with the complaints may go through multiple steps such as word splitting 622, word embedding 623, generating vector representations 624 (e.g., for selected words, and then for the data in text format), and clustering 625 based on the vector representations. In some embodiments, the training data for the NLP may be obtained from historical complaints with categorical labels. For example, each complaint may have been categorically labeled by a customer service employee according to certain guidelines when it was initially filed. Even though the accuracy of manual labeling may be suboptimal, it may be improved by one or more rounds of auditing and examination, or using self-training/co-training method in semi-supervised learning algorithm (e.g., manually improving the labeling accuracy for a small amount of training data, training a classier using a supervised learning algorithm based on this small amount of training data, then applying this classifier to the rest of the training data to improve the overall labeling accuracy of the training data). In some embodiments, the categories and the corresponding labels may be predetermined by the service provider (e.g., the ride-hailing platform).

In some embodiments, the categorization module 620 may send the categorized complaints to the issue spotting module 630 at step 626. The issue spotting module 630 may discover the causes (e.g., problematic strategies applied to orders or omitted) of the complaints. In some embodiments, the issue spotting module 630 may pick a plurality of popular categories to process. The popularity of a category may be determined by various factors, such as the number of complaints in the category, the growing speed or trend of the number of complaints in the category, the priority assigned to the category, another suitable criterion, or any combination thereof. In some embodiments, the complaints belonging to the same category may focus on one or more service quality issues. In some embodiments, these service quality issues may have been mapped to the corresponding strategies. For example, the issue of long pickup-waiting-time at airport may be mapped to airport order-dispatching strategies, the issue of insufficient driver's bonus may be mapped to driver's incentive strategies. In some embodiments, the issue spotting module 630 may identify the problematic strategies causing the complaints in a candidate category based on the mapping. These identified strategies may be sent to the strategy optimization module 640 at step 634 as the candidate strategies to be optimized.

In some embodiments, for each of the candidate strategies, the strategy optimization module 640 may use various machine learning algorithms to obtain an optimal strategy to minimize the false positive and false negative rates of the candidate strategy at step 642. In some embodiments, the strategy optimization module 640 may select a predetermined number of historical orders as the training data to train the machine learning models. The historical orders in the training data may be preprocessed by adding proper labels. For example, a manual process may be adopted to properly label a small amount of the historical orders in the training data. Then these labeled historical orders may be used to train a classifier, which may be applied to the rest of the training data to generate more labeled training data. In some embodiments, the training data may be split into multiple datasets, such as one dataset for learning an optimized strategy, and another dataset for measuring the quality of the optimized strategy (e.g., based on the false positive rate and false negative rate). The candidate strategy optimization using machine learning models is described in further details herein at least with regard to FIG. 5. In some embodiments, the optimized strategies may be sent to the strategy deployment module 650 at step 644. The strategy deployment module 650 may deploy the optimized strategies in various ways. In some embodiments, the optimized strategies may be rolled out to the entire fleet at once. In some embodiments, the optimized strategies may be first rolled out to a small number of regions (e.g., using canary testing) to verify the improvement, and after the improvement being confirmed, then rolled out to the fleet.

Figure 7:
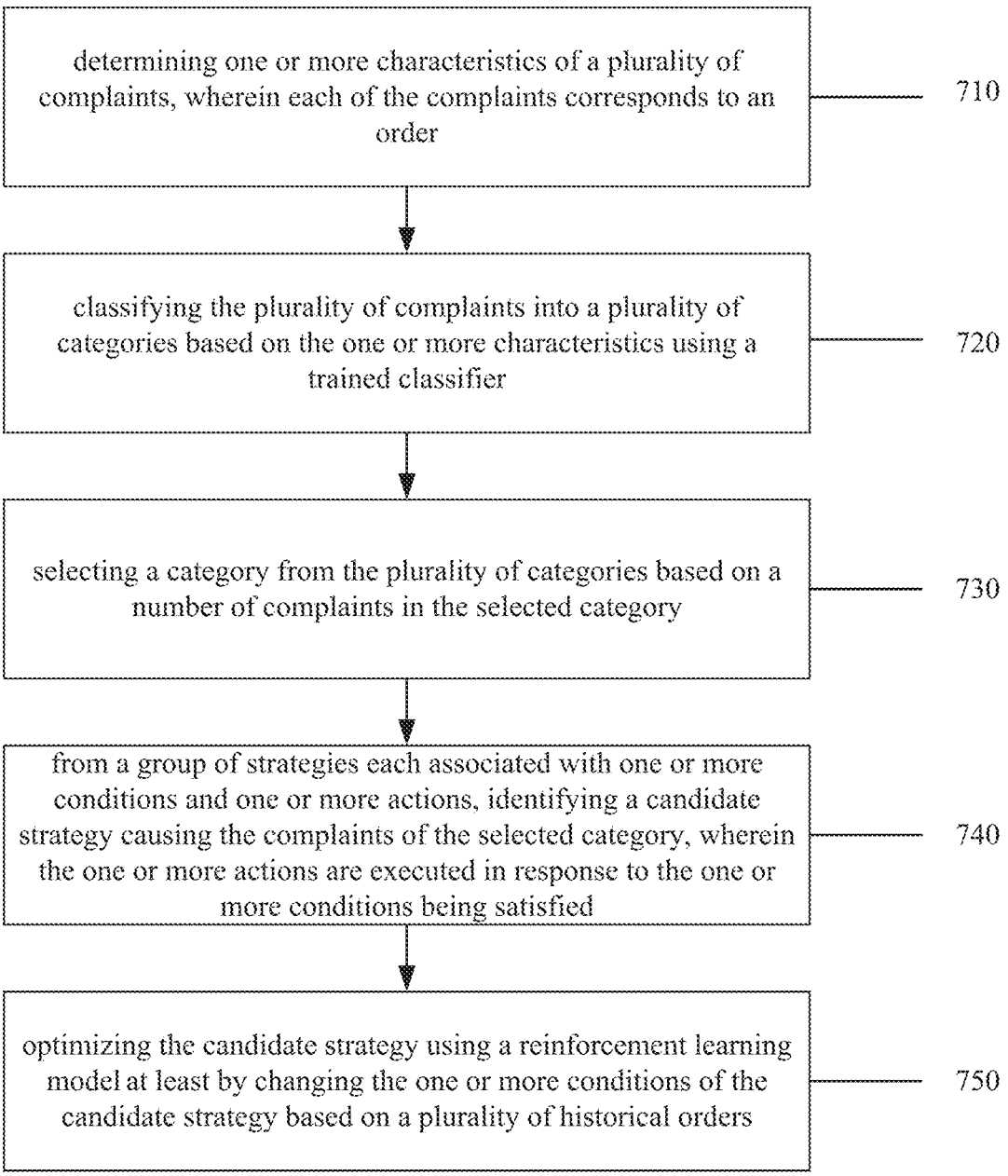
FIG. 7 illustrates a method for automatically adjusting strategies based on feedbacks according to some embodiments.

FIG. 7 illustrates a method for automatically adjusting strategies based on feedbacks according to some embodiments. The method 700 may be implemented in an environment shown in FIG. 1. The method 700 may be performed by a device, apparatus, or system shown in FIGS. 2-6. Depending on the implementation, the method 700 may include additional, fewer, or alternative steps performed in various orders or in parallel.

Block 710 includes determining one or more characteristics of a plurality of complaints, wherein each of the complaints corresponds to an order. In some embodiments, the determining one or more characteristics of a plurality of complaints may comprise, for each of the complaints, using Natural Language Processing (NLP) to: extract one or more first features from a content of the each complaint; extract one or more second features from the order corresponding to the each complaint; and extract one or more third features from a user profile associated with the order corresponding to the each complaint, wherein the one or more characteristics comprise the first, second, and third features.

Block 720 includes classifying the plurality of complaints into a plurality of categories based on the one or more characteristics using a classifier. In some embodiments, the classifier may be trained as using semi-supervised machine learning based on a first plurality of historical complaints with corresponding categorical labels and a second plurality of historical complaints that are not labeled. In some embodiments, the classifier may comprise an unsupervised machine learning model configured to group the complaints based on vector representations of the one or more characteristics of the plurality of complaints.

Block 730 includes selecting a category from the plurality of categories based on a number of complaints in the selected category. In some embodiments, the selecting a category from the categories based on a number of complaints in the selected category may comprise: selecting the category if the number of complaints in the category is greater than a threshold. In some embodiments, the selecting a category from the plurality of categories based on a number of complaints in the selected category may comprise: selecting the category if an increase of the number of complaints in the selected category during a period of time is greater than a threshold.

Block 740 includes from a group of strategies each associated with one or more conditions and one or more actions, identifying a candidate strategy causing the complaints of the selected category, wherein the one or more actions are executed in response to the one or more conditions being satisfied. In some embodiments, the identifying a candidate strategy causing the complaints may comprise: in response to the complaints complaining about a false positive error, selecting the candidate strategy based on a number of orders that have applied the candidate strategy; and in response to the complaints complaining about a false negative error, selecting the candidate strategy based on a number of orders that have skipped the candidate strategy. In some embodiments, the one or more conditions may be based on one or more of the following parameters: time of the order, pickup location, and destination.

Block 750 includes optimizing the candidate strategy using a reinforcement learning model at least by changing the one or more conditions of the candidate strategy based on a plurality of historical orders. In some embodiments, the optimizing a candidate strategy using a reinforcement learning model may comprise: building one or more search graphs using Monte Carlo Graph Search (MCGS) algorithm based on a plurality of historical orders. In some embodiments, the optimizing a candidate strategy may comprise: determining a false positive rate and a false negative rate by examining the optimized candidate strategy against the plurality of historical orders, wherein each of the plurality of historical orders is labeled with whether an action associated with the candidate strategy should have been performed. In some embodiments, the optimizing a candidate strategy may at least lower a false positive rate.

Figure 8:
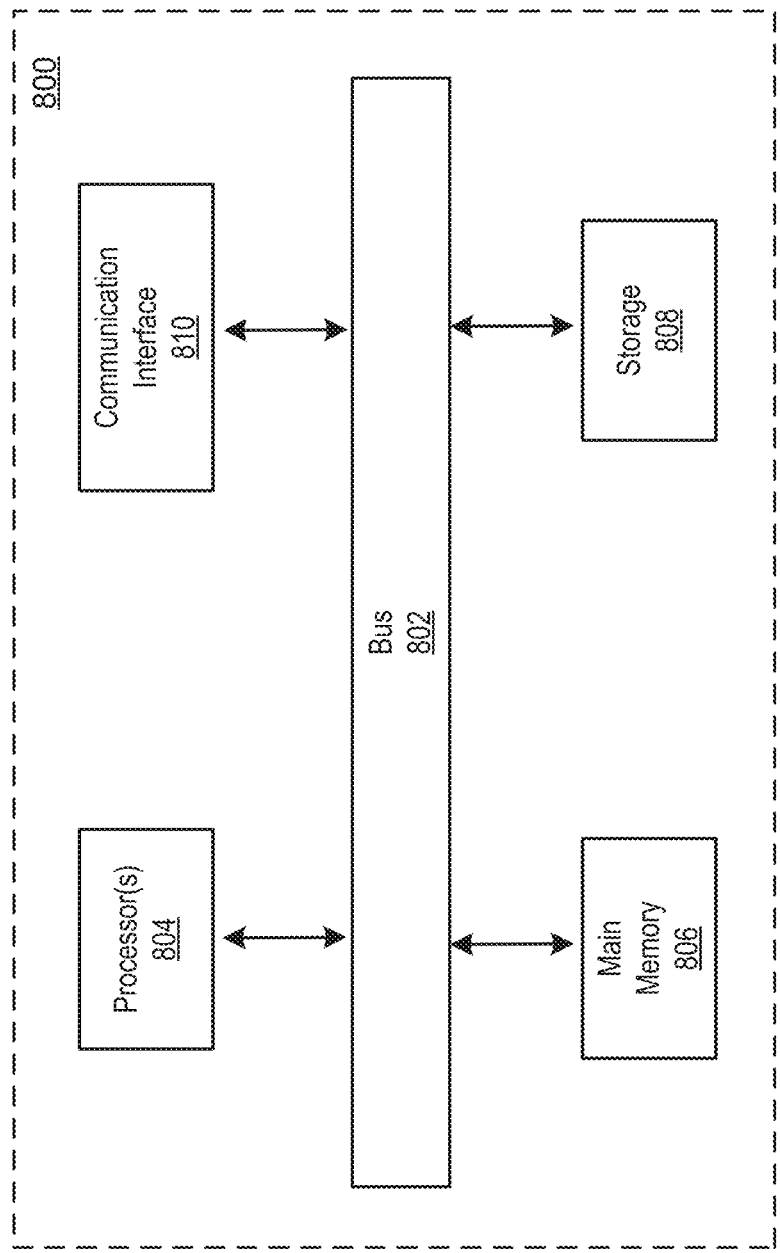
FIG. 8 illustrates a block diagram of a computer system for implementing embodiments described herein.

FIG. 8 illustrates a block diagram of a computer system 800 in which any of the embodiments described herein may be implemented. The computer system 800 may be implemented in any of the components of the systems illustrated in FIGS. 1-7. One or more of the example methods illustrated by FIGS. 1-7 may be performed by one or more implementations of the computer system 800.

The computer system 800 may include a bus 802 or other communication mechanism for communicating information, one or more hardware processor(s) 804 coupled with bus 802 for processing information. Hardware processor(s) 804 may be, for example, one or more general purpose microprocessors.

The computer system 800 may also include a main memory 806, such as a random-access memory (RAM), cache and/or other dynamic storage devices, coupled to bus 802 for storing information and instructions executable by processor(s) 804. Main memory 806 also may be used for storing temporary variables or other intermediate information during execution of instructions executable by processor(s) 804. Such instructions, when stored in storage media accessible to processor(s) 804, render computer system 800 into a special-purpose machine that is customized to perform the operations specified in the instructions. The computer system 800 may further include a read only memory (ROM) 808 or other static storage device coupled to bus 802 for storing static information and instructions for processor(s) 804. A storage device 810, such as a magnetic disk, optical disk, or USB thumb drive (Flash drive), etc., may be provided and coupled to bus 802 for storing information and instructions.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the operations, methods, and processes described herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 may cause processor(s) 804 to perform the process steps described herein. In alternative embodiments, hard-wired circuitry may be used in place of or in combination with software instructions.

The main memory 806, the ROM 808, and/or the storage device 810 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 800 may include a network interface 818 coupled to bus 802. Network interface 818 may provide a two-way data communication coupling to one or more network links that are connected to one or more local networks. For example, network interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 may send and receive electrical, electromagnetic or optical signals that carry digital data streams representing various types of information.

The computer system 800 can send messages and receive data, including program code, through the network(s), network link and network interface 818. In the Internet example, a server might transmit a requested code for an application program through the Internet, the ISP, the local network and the network interface 818.

The received code may be executed by processor(s) 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

What is claimed is:

1. A computer-implemented method for automatically adjusting strategies, comprising:
    determining one or more characteristics of a plurality of complaints, wherein each of the complaints corresponds to an order;
    classifying the plurality of complaints into a plurality of categories based on the one or more characteristics by using a trained classifier;
    selecting a category from the plurality of categories based on a number of complaints in the selected category;
    from a group of strategies each associated with one or more conditions and one or more actions, identifying a candidate strategy causing the complaints of the selected category, wherein the one or more actions are executed in response to the one or more conditions being satisfied, and the identifying comprises:
        in response to the complaints complaining about a false positive error, selecting the candidate strategy based on a number of orders that have applied the candidate strategy, and in response to the complaints complaining about a false negative error, selecting the candidate strategy based on a number of orders that have skipped the candidate strategy; and optimizing the candidate strategy using a reinforcement learning model at least by changing the one or more conditions of the candidate strategy based on a plurality of historical orders.

2. The method of claim 1, wherein the determining one or more characteristics of a plurality of complaints comprises, for each of the complaints, using Natural Language Processing (NLP) to:

extract one or more first features from a content of the each complaint;

extract one or more second features from the order corresponding to the each complaint; and extract one or more third features from a user profile associated with the order corresponding to the each complaint, wherein the one or more characteristics comprise the first, second, and third features.

3. The method of claim 1, wherein the classifier is trained as using semi-supervised machine learning based on a first plurality of historical complaints with corresponding categorical labels and a second plurality of historical complaints that are not labeled.

4. The method of claim 1, wherein the classifier comprises an unsupervised machine learning model trained to group the complaints based on vector representations of the one or more characteristics of the plurality of complaints.

5. The method of claim 1, wherein the selecting a category from the categories based on a number of complaints in the selected category comprises:

selecting the category if the number of complaints in the category is greater than a threshold.

6. The method of claim 1, wherein the selecting a category from the plurality of categories based on a number of complaints in the selected category comprises:

selecting the category if an increase of the number of complaints in the selected category during a period of time is greater than a threshold.

7. The method of claim 1, wherein:

the one or more conditions are based on one or more of the following parameters: time of the order, pickup location, and destination.

8. The method of claim 1, wherein the optimizing a candidate strategy using a reinforcement learning model comprises:

building one or more search graphs using Monte Carlo Graph Search (MCGS) algorithm based on a plurality of historical orders.

9. The method of claim 1, wherein the optimizing a candidate strategy comprises:

determining a false positive rate and a false negative rate by examining the optimized candidate strategy against the plurality of historical orders, wherein each of the plurality of historical orders is labeled with whether an action associated with the candidate strategy should have been performed.

10. The method of claim 1, wherein the optimizing a candidate strategy at least lowers a false positive rate.

11. A non-transitory computer-readable storage medium for automatically adjusting strategies, configured with instructions executable by one or more processors to cause the one or more processors to perform operations comprising:

determining one or more characteristics of a plurality of complaints, wherein each of the complaints corresponds to an order;

classifying the plurality of complaints into a plurality of categories based on the one or more characteristics by using a trained classifier;

selecting a category from the plurality of categories based on a number of complaints in the selected category;

from a group of strategies each associated with one or more conditions and one or more actions, identifying a candidate strategy causing the complaints of the selected category, wherein the one or more actions are executed in response to the one or more conditions being satisfied; and optimizing the candidate strategy using a reinforcement learning model at least by changing the one or more conditions of the candidate strategy based on a plurality of historical orders, wherein the optimizing comprises:

determining a false positive rate and a false negative rate by examining the optimized candidate strategy against the plurality of historical orders, wherein each of the plurality of historical orders is labeled with whether an action associated with the optimized candidate strategy should have been performed.

12. The non-transitory computer readable storage medium of claim 11, wherein the determining one or more characteristics of a plurality of complaints comprises, for each of the complaints, using Natural Language Processing (NLP) to:

extract one or more first features from a content of the each complaint;

extract one or more second features from the order corresponding to the each complaint; and extract one or more third features from a user profile associated with the order corresponding to the each complaint, wherein the one or more characteristics comprise the first, second, and third features.

13. The non-transitory computer readable storage medium of claim 11, wherein the classifier is trained as using semi-supervised machine learning based on a first plurality of historical complaints with corresponding categorical labels and a second plurality of historical complaints that are not labeled.

14. The non-transitory computer readable storage medium of claim 11, wherein the classifier comprises an unsupervised machine learning model trained to group the complaints based on vector representations of the one or more characteristics of the plurality of complaints.

15. The non-transitory computer readable storage medium of claim 11, wherein the selecting a category from the categories based on a number of complaints in the selected category comprises:

selecting the category if the number of complaints in the category is greater than a threshold.

16. The non-transitory computer readable storage medium of claim 11, wherein the optimizing the candidate strategy using a reinforcement learning model comprises:

building one or more search graphs using Monte Carlo Graph Search (MCGS) algorithm based on a plurality of historical orders.

17. The non-transitory computer readable storage medium of claim 11, wherein the optimizing a candidate strategy at least lowers a false positive rate.

18. A method for automatically adjusting strategies, the method comprising:

determining one or more characteristics of a plurality of feedbacks, wherein each of the feedbacks corresponds to an order;

classifying the plurality of feedbacks into a plurality of categories based on the one or more characteristics using a classifier;

selecting a category from the plurality of categories based on a number of feedbacks in the selected category;

from a group of strategies each associated with one or more conditions and one or more actions, identifying a candidate strategy resulting in the feedbacks of the selected category, wherein the one or more actions are executed in response to the one or more conditions being satisfied; and in response to the feedbacks of the selected category comprising complaints, optimizing the candidate strategy using a reinforcement learning model at least by changing the one or more conditions of the candidate strategy based on a plurality of historical orders, wherein the optimizing comprises:

determining a false positive rate and a false negative rate by examining the optimized candidate strategy against the plurality of historical orders, wherein each of the plurality of historical orders is labeled with whether an action associated with the optimized candidate strategy should have been performed.

* * * * *